United States Patent
Berjot et al.

(10) Patent No.: US 11,542,025 B2
(45) Date of Patent: Jan. 3, 2023

(54) AIRCRAFT PROPULSION ASSEMBLY COMPRISING LINKS OF A FRONT ENGINE MOUNT THAT ARE DIRECTLY CONNECTED TO A FRONT TRANSVERSE REINFORCEMENT OF A PRIMARY STRUCTURE OF AN AIRCRAFT PYLON

(71) Applicant: Airbus Operations SAS, Toulouse (FR)

(72) Inventors: Michael Berjot, Toulouse (FR); Thomas Deforet, Toulouse (FR); Jacky Puech, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/407,251

(22) Filed: Aug. 20, 2021

(65) Prior Publication Data
US 2022/0055758 A1 Feb. 24, 2022

(30) Foreign Application Priority Data
Aug. 24, 2020 (FR) ....................................... 2008634

(51) Int. Cl.
*B64D 27/26* (2006.01)
(52) U.S. Cl.
CPC ........ *B64D 27/26* (2013.01); *B64D 2027/266* (2013.01)
(58) Field of Classification Search
CPC .......................... B64D 27/26; B64D 2027/266
See application file for complete search history.

(56) References Cited

U.S. PATENT DOCUMENTS

| 2018/0186462 A1* | 7/2018 | Brochard | .................. F02C 7/20 |
| 2020/0207481 A1 | 7/2020 | Combes et al. | |

FOREIGN PATENT DOCUMENTS

| FR | 3073204 A1 * | 5/2019 | ............. B64D 27/26 |
| FR | 3073205 A1 | 5/2019 | |
| WO | 2018233860 A1 | 12/2018 | |
| WO | WO-2018233860 A1 * | 12/2018 | ............. B64D 27/26 |

OTHER PUBLICATIONS

Translation of FR-3073204-A1 (Year: 2019).*
WO-2018233860-A1 (Year: 2018).*
French Search Report; priority document.

* cited by examiner

*Primary Examiner* — Christopher D Hutchens
*Assistant Examiner* — Steven J Shur
(74) *Attorney, Agent, or Firm* — Greer, Burns & Crain, Ltd.

(57) ABSTRACT

A propulsion assembly including a primary structure of a pylon having right and left extensions projecting with respect to right and left lateral panels of the primary structure and also right and left brackets, each having a first flank connected to the right or left lateral panel of the primary structure and a second flank pressed against the right or left extension, a front engine mount having first and second links, each connected to an engine and directly to the front transverse reinforcement by a first or second reinforcement connection pin passing through the right or left extension and the second flank of the right or left bracket.

11 Claims, 4 Drawing Sheets

AIRCRAFT PROPULSION ASSEMBLY COMPRISING LINKS OF A FRONT ENGINE MOUNT THAT ARE DIRECTLY CONNECTED TO A FRONT TRANSVERSE REINFORCEMENT OF A PRIMARY STRUCTURE OF AN AIRCRAFT PYLON

CROSS-REFERENCES TO RELATED APPLICATIONS

This application claims the benefit of the French patent application No. 2008634 filed on Aug. 24, 2020, the entire disclosures of which are incorporated herein by way of reference.

FIELD OF THE INVENTION

The present application relates to an aircraft propulsion assembly comprising links of a front engine mount that are directly connected to a front transverse reinforcement of a primary structure of an aircraft pylon and also to an aircraft comprising at least one such propulsion assembly.

BACKGROUND OF THE INVENTION

According to one embodiment which can be seen in FIGS. 1 and 2, an aircraft 10 comprises a plurality of propulsion assemblies 12 positioned under each of the wings 14 of the aircraft. Each propulsion assembly 12 comprises an engine 16, a nacelle (not shown in FIG. 2) positioned around the engine 16 and also a pylon 18 connecting the engine 16 and the wing 14. The pylon 18 comprises a primary structure 20 which is connected to the engine 16 by an engine mount 22 and to the wing 14 by a wing mount 24.

For the present document, a longitudinal direction X is parallel to the axis of rotation A16 of the engine 16, a horizontal transverse direction Y is horizontal and perpendicular to the axis of rotation A16 of the engine 16, a vertical transverse direction Z is vertical and perpendicular to the axis of rotation A16 of the engine 16. A transverse plane is perpendicular to the longitudinal direction X. The notions of front and rear make reference to the direction of flow of the gases, the front corresponding to the intake of the gases (air) into the engine and the rear corresponding to the exhaust of the gases (combustion gases).

The engine mount 22 comprises a front engine mount 26, a rear engine mount 28 and a pair of thrust links 30 which provide for taking up the thrust forces.

According to one configuration which can be seen in FIG. 3, the primary structure 20 comprises upper and lower spars 20.1, right and left lateral panels 20.2 and also a plurality of transverse reinforcements connecting the upper and lower spars 20.1 and also the right and left lateral panels 20.2. A front transverse reinforcement 20.3 is positioned in front of the primary structure 20 of the pylon. According to one configuration which can be seen in FIGS. 3 to 6, the front transverse reinforcement 20.3 has a bearing surface F20 in order to fix the front engine mount 26, positioned in a horizontal plane, under the front transverse reinforcement 20.3.

According to one embodiment, the front transverse reinforcement 20.3 is obtained from a forged raw part and then machined.

According to one embodiment which can be seen in FIGS. 3 and 6, the front engine mount 26 comprises:

a transverse beam 32 connected to the front transverse reinforcement 20.3 of the primary structure 20 by vertical connection elements 34 and to the engine 16 by a safety connection pin 36, a first link 38 connected to the engine 16 by a first engine connection pin 40 and to the transverse beam 32 by a first beam connection pin 42, a second link 44 connected to the engine 16 by a second engine connection pin 46 and to the transverse beam 32 by a second beam connection pin 48.

For each beam connection pin 42, 48, the transverse beam 32 comprises a clevis having two flanges 32.1, 32.2, which can be seen in FIGS. 3 and 5, between which there is positioned the first or second link 38, 44.

For each engine connection pin 40, 46, the engine 16 comprises a clevis having a two flanges 16.1, 16.2 between which there is positioned the first or second link 38, 44.

Each link 38, 44 comprises a ball joint for each engine connection pin 40, 46 or beam connection pin 42, 48.

When mounting the engine 16, the links 38, 44 are mounted on the engine 16 and then the transverse beam 32 is connected to the links 38, 44. The engine 16 is then raised or hoisted in order to press the transverse beam 32 against the bearing surface F20 of the front transverse reinforcement 20.3 of the primary structure 20 of the pylon and then the vertical connection elements 34 are put in place.

According to one configuration illustrated by document FR3073204, the bearing surface F20 of the front transverse reinforcement 20.3 of the primary structure 20 of the pylon is vertical and positioned in front of the front transverse reinforcement 20.3. According to this configuration, as above, the engine 16 equipped with the links 38, 44 and also with the transverse beam 32 is raised or hoisted until the latter is positioned in front of the front transverse reinforcement 20.3, and then horizontal connection elements are put in place in order to connect the transverse beam 32 and the front transverse reinforcement 20.3.

Whatever the configuration, the transverse beam 32 is a solid part, obtained from a forged raw part, which requires long and complex machining Moreover, the transverse beam 32 is a bulky part which has to be positioned in a confined space which is difficult to access.

The present invention aims to overcome all or some of the disadvantages of the prior art.

Accordingly, the invention relates to a propulsion assembly comprising a primary structure of a pylon, an engine and also a front engine mount connecting the primary structure and the engine, the primary structure having upper and lower spars, right and left lateral panels and also a front transverse reinforcement, the front engine mount having a first link connected to the engine by a first engine connection pin and also a second link connected to the engine by a second engine connection pin.

According to the invention, the front transverse reinforcement comprises right and left extensions projecting with respect to the right and left lateral panels, a right bracket having a first flank connected to the right lateral panel of the primary structure and a second flank pressed against the right extension and also a left bracket having a first flank connected to the left lateral panel of the primary structure and a second flank pressed against the left extension, the front engine mount comprising a first reinforcement connection pin connecting the first link and the front transverse reinforcement and passing through the right extension and the second flank of the right bracket and also a second reinforcement connection pin connecting the second link and the front transverse reinforcement and passing through the left extension and the second flank of the left bracket.

According to one particular feature of the invention, the first and second links of the front engine mount are directly connected to the front transverse reinforcement of the primary structure of the pylon, with the result that the transverse beam is dispensed with.

According to another feature, the front engine mount comprises at least one safety connection pin connecting the front transverse reinforcement and the engine, the front transverse reinforcement comprising a lower extension projecting with respect to the lower spar of the primary structure having the safety connection pin passing through it.

According to another feature, the front engine mount comprises two safety connection pins, each of the right and left extensions comprising a region projecting with respect to the lower spar in order to form a lower extension.

According to another feature, the second flank of the right bracket and the right extension comprise a first reinforcement bore intended for the first reinforcement connection pin of the first link and also a second reinforcement bore intended for a first safety connection pin. In addition, the second flank of the left bracket and the left extension comprise a first reinforcement bore intended for the second reinforcement connection pin of the second link and also a second reinforcement bore intended for a second safety connection pin.

According to another feature, the second flanks of the right and left brackets have the same geometry as the right and left extensions.

According to another feature, the front engine mount is symmetrical.

According to another feature, each of the first and second links has a Y shape and comprises a single branch at a first end cooperating with a clevis of the engine and also two branches parallel to one another at a second end between which there are positioned the right or left extension and the second flank of the right or left bracket.

According to another feature, the upper and lower spars and also the right and left lateral panels delimit a front opening. In addition, the front transverse reinforcement comprises a plate comprising the right and left extensions and also a projecting shape projecting with respect to the plate and configured to fit into the front opening, the first flank of the right bracket being interposed between the projecting shape and the right lateral panel, the first flank of the left bracket being interposed between the projecting shape and the left lateral panel.

According to one feature, the first flank of the right bracket is connected to an inner face of the right lateral panel of the primary structure, and the first flank of the left bracket is connected to an inner face of the left lateral panel of the primary structure.

According to another feature, the right bracket is made in one piece and the left bracket is made in one piece.

The invention also relates to an aircraft having at least one propulsion assembly according to one of the above features.

BRIEF DESCRIPTION OF THE DRAWINGS

Other features and advantages will emerge from the description of the invention which will follow, the description being given by way of example only with reference to the appended drawings, in which.

DETAILED DESCRIPTION OF THE PREFERRED EMBODIMENTS

In FIGS. 7 to 13 there is shown a front engine mount 50 of a propulsion assembly connecting a primary structure 52 of an aircraft pylon and an engine 54. In these various figures, only part of the casing of the engine 54 and the front part of the primary structure 52 are shown.

Figure 1:
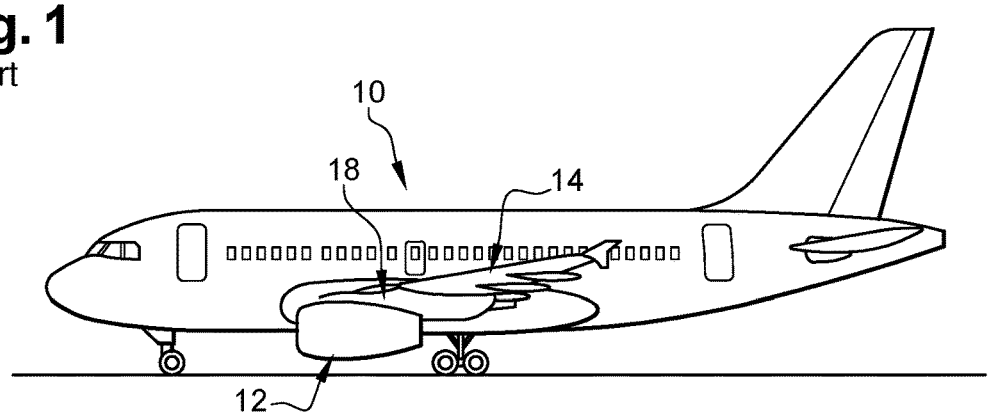
FIG. 1 is a side view of an aircraft.
Figure 2:
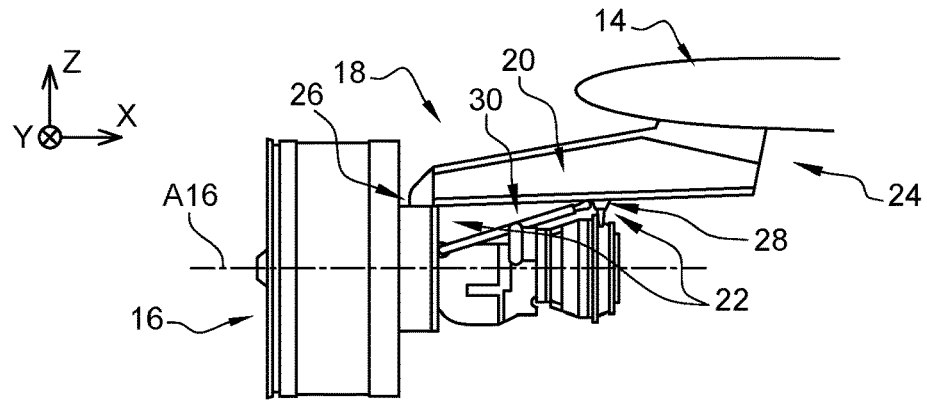
FIG. 2 is a side view of a propulsion assembly without nacelle.
Figure 3:
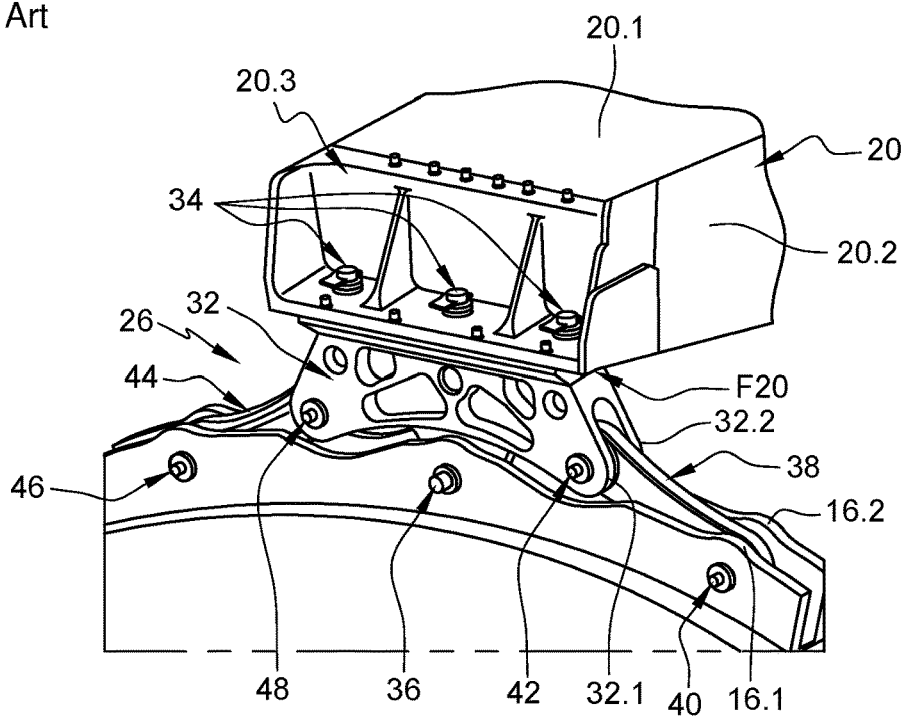
FIG. 3 is a perspective view of a front engine mount illustrating one embodiment of the prior art.
Figure 4:
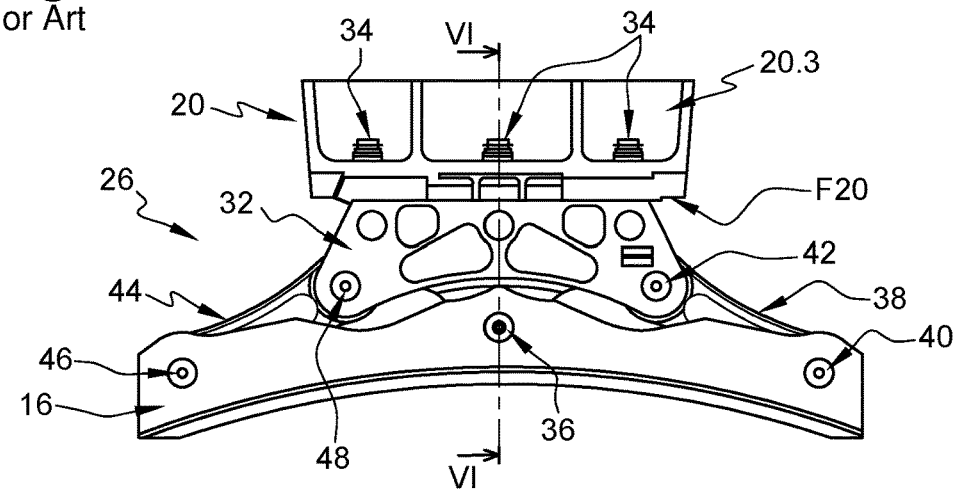
FIG. 4 is a front view of the front engine mount which can be seen in FIG. 3.
Figure 5:
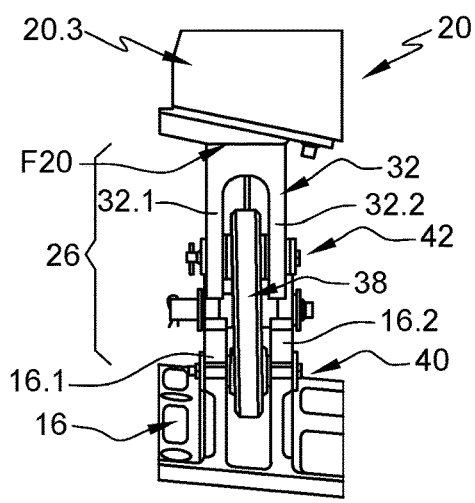
FIG. 5 is a side view of the front engine mount which can be seen in FIG. 3.
Figure 6:
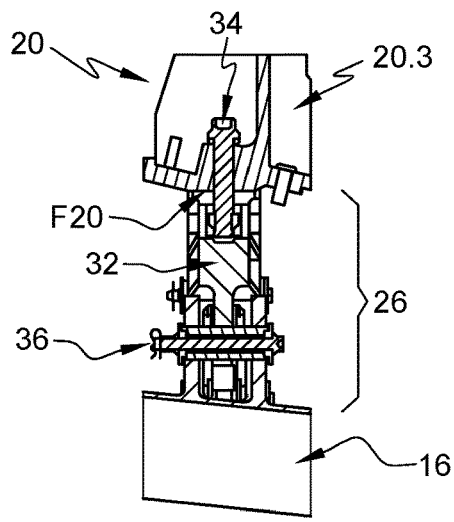
FIG. 6 is a section taken along the line VI-VI of FIG. 4 of the front engine mount which can be seen in FIG. 3.
Figure 7:
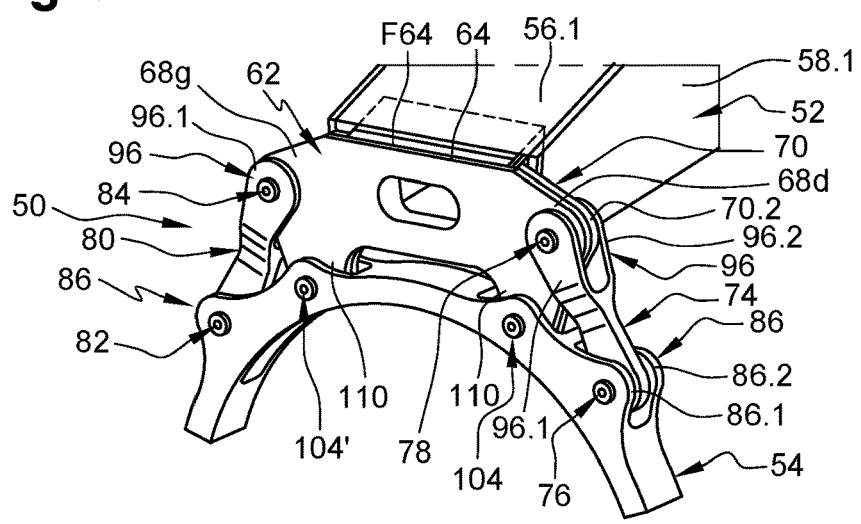
FIG. 7 is a perspective view of a front engine mount illustrating one embodiment of the invention.
Figure 8:
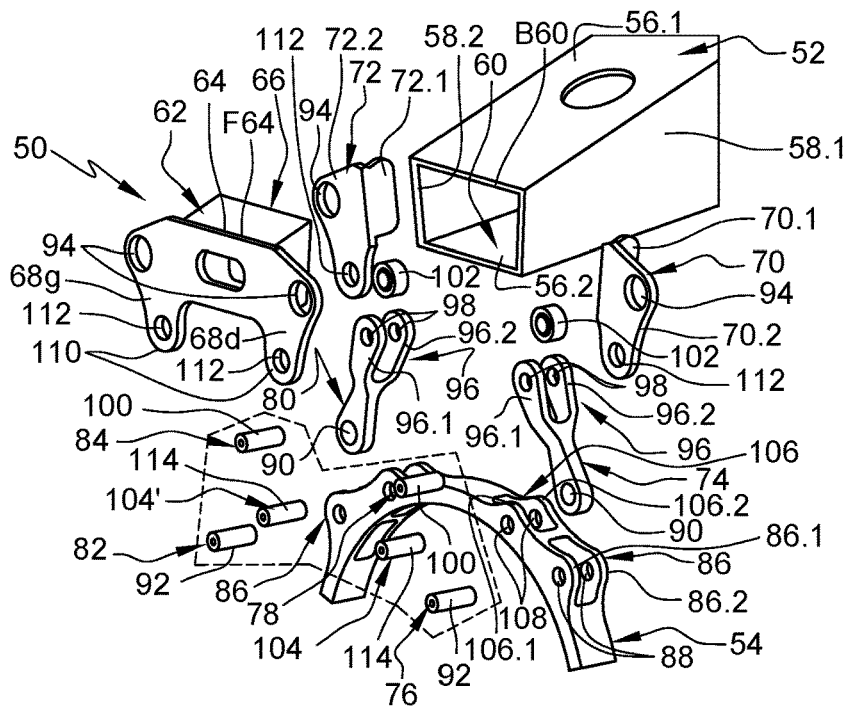
FIG. 8 is an exploded perspective view of the front engine mount which can be seen in FIG. 7.
Figure 9:
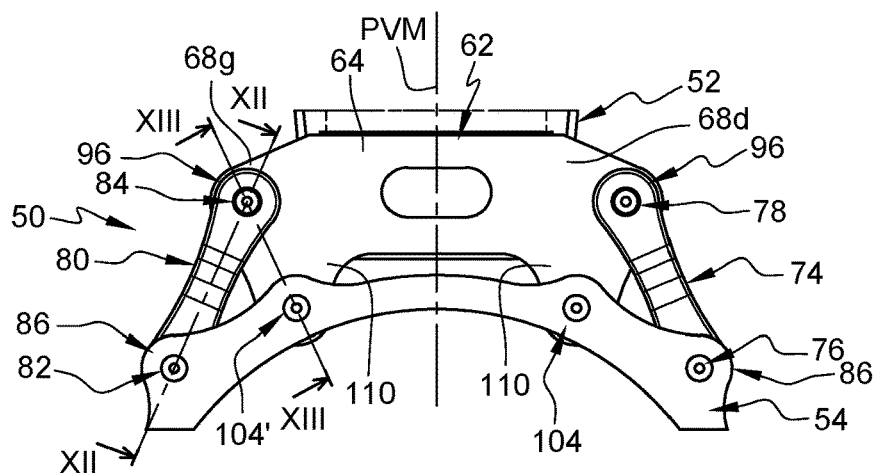
FIG. 9 is a front view of the front engine mount which can be seen in FIG. 7.
Figure 10:
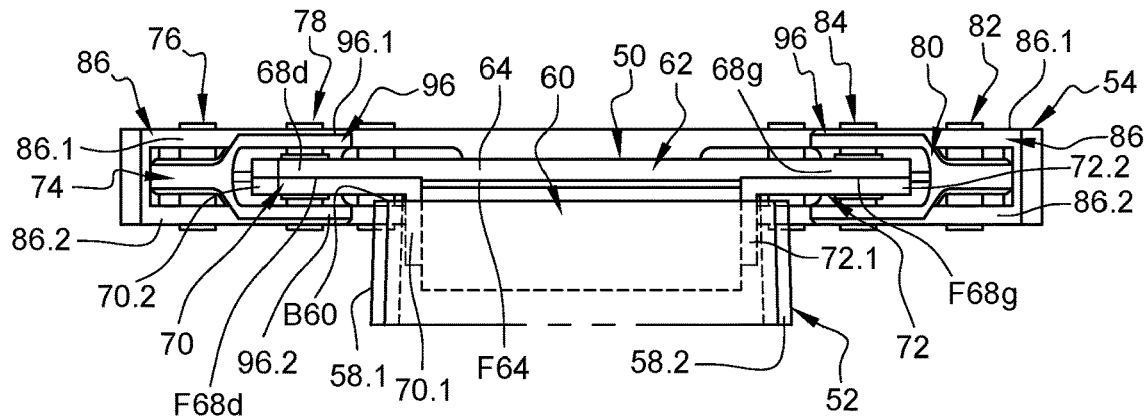
FIG. 10 is a top view of the front engine mount which can be seen in FIG. 7.
Figure 11:
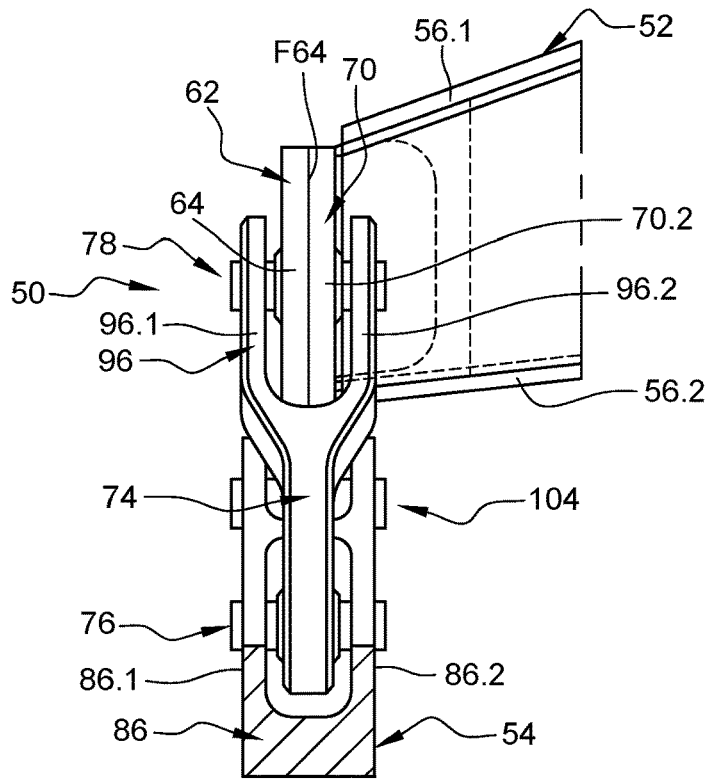
FIG. 11 is a side view of the front engine mount which can be seen in FIG. 7.

According to one embodiment which can be seen, in particular, in FIG. 8, the primary structure 52 comprises upper and lower spars 56.1, 56.2, right and left lateral panels 58.1, 58.2 and also transverse reinforcements (not shown). The upper and lower spars 56.1, 56.2 and the right and left lateral panels 58.1, 58.2 delimit, at the front of the primary structure 52, a front opening 60. Each of the upper and lower spars 56.1, 56.2 and also right and left lateral panels 58.1, 58.2 comprises an inner face and an outer face. Each of the inner faces of the upper and lower spars 56.1, 56.2 and also right and left lateral panels 58.1, 58.2 form, in the vicinity of the front opening 60, an inner bearing surface.

Of course, the invention is not limited to this embodiment for the primary structure 52. Whatever the embodiment, the primary structure 52 comprises a front opening 60, delimited by a front edge B60 positioned approximately in a transverse plane, having a polygonal (square or rectangular) inner cross section.

The primary structure 52 also comprises a front transverse reinforcement 62 having a plate 64, positioned approximately in a transverse plane, which has a rear face F64 oriented toward the primary structure 52. The front transverse reinforcement 62 comprises a projecting shape 66, projecting with respect to the rear face F64 and configured to fit into the front opening 60. According to one configuration, the projecting shape 66 comprises four walls respectively parallel to the upper and lower spars 56.1, 56.2 and also to the right and left lateral panels 58.1, 58.2.

According to one embodiment, the plate 64 and the projecting shape 66 form only a single mechanically welded or forged and then machined part.

The plate 64 has right and left extensions 68$d$, 68$g$ projecting with respect to the right and left lateral panels 58.1, 58.2, each of them offering a bearing face F68$d$, F68$g$ corresponding to part of the rear face F64 of the plate 64.

The front transverse reinforcement 62 also comprises a right bracket 70 which has a first flank 70.1 interposed between the projecting shape 66 and the right lateral panel 58.1 of the primary structure 52 and a second flank 70.2 pressed against the bearing face F68*d* of the right extension 68*d* of the plate 64 and also a left bracket 72 which has a first flank 72.1 interposed between the projecting shape 66 and the left lateral panel 58.2 of the primary structure 52 and a second flank 72.2 pressed against the bearing face F68*g* of the left extension 68*g* of the plate 64. The right bracket 70 is made in one piece, that is to say, the first flank 70.1 and the second flank 70.2 of the right bracket 70 are monoblock. Likewise, the left bracket 72 is made in one piece, that is to say, the first flank 72.1 and the second flank 72.2 of the left bracket 72 are monoblock. The first flank 70.1 of the right bracket 70 is situated facing the inner face of the right lateral panel 58.1, and the first flank 72.1 of the left bracket 72 is situated facing the inner face of the left lateral panel 58.2.

According to this embodiment, the second flanks 70.2, 72.2 of the right and left brackets 70, 72 are pressed against the front edge B60 of the front opening 60 of the primary structure 52.

This front transverse reinforcement 62 is connected to the upper and lower spars 56.1, 56.2 and/or to the right and left lateral panels 58.1, 58.2 by connection elements which pass through the upper and lower spars 56.1, 56.2 and/or the right and left lateral panels 58.1, 58.2, the walls of the projecting shape 66 and the first flanks 70.1, 72.1 of the right and left brackets 70, 72.

Of course, the invention is not limited to this embodiment. Thus, according to another embodiment, the projecting shape 66 can have a cross section substantially identical to that of the primary structure 52 at the front opening 60 and also faces F66 configured to bear against the inner bearing surfaces of the upper and lower spars 56.1, 56.2 and right and left lateral panels 58.1, 58.2. According to this other embodiment, the first flank 70.1 of the right bracket 70 is pressed against the outer face of right lateral panel 58.1 of the primary structure 52, and the first flank 72.1 of the left bracket 72 is pressed against the outer face of the left lateral panel 58.2 of the primary structure. The rear face F64 of the plate 64 is pressed against the front edge B60 of the front opening 60 of the primary structure 52.

Whatever the embodiment, the first flank 70.1 of the right bracket 70 is connected to the right lateral panel 58.1 of the primary structure 52, and the first flank 72.1 of the left bracket 72 is connected to the left lateral panel 58.2 of the primary structure 52. For example, the first flank 70.1 of the right bracket 70 is connected to the inner face of the right lateral panel 58.1 of the primary structure 52, and the first flank 72.1 of the left bracket 72 is connected to the inner face of the left lateral panel 58.2 of the primary structure 52.

The front engine mount 50 comprises, in addition to the front transverse reinforcement 62, a first link 74 connected to engine 54 by a first engine connection pin 76 and to the front transverse reinforcement 62 by a first reinforcement connection pin 78 and also a second link 80 connected to the engine 54 by a second engine connection pin 82 and to the front transverse reinforcement 62 by a second reinforcement connection pin 84.

For each of the first and second engine connection pins 76, 82, the engine 54 comprises a clevis 86 having first and second flanges 86.1, 86.2 which are parallel to one another, spaced between them and positioned in substantially transverse planes, the first and second flanges 86.1, 86.2 having coaxial engine bores 88. In parallel, each of the first and second links 74, 80 comprises a link bore 90 coaxial to the engine bores 88 when the first and second engine connection pins 76, 82 are mounted. Each of the first and second engine connection pins 76, 82 comprises a hollow tube 92 configured to be housed in the engine and link bores 88, 90, approximately parallel to the longitudinal direction. Each hollow tube 92 can be associated with a translation-blocking system in order to keep it in the engine and link bores 88, 90.

For each of the first and second reinforcement connection pin 78, 84, the right or left extension 68*d*, 68*g* of the plate 64 and the second flank 70.2, 72.2 of the right or left bracket 70, 72 are traversed by the first or second reinforcement connection pin 78, 84 and comprise reinforcement bores 94. In parallel, each of the first and second links 74, 80 comprises a clevis 96 having first and second branches 96.1, 96.2 parallel to one another, spaced between them and positioned in substantially transverse planes, the first and second branches 96.1, 96.2 having coaxial link bores 98. In operation, the right or left extension 68*d*, 68*g* of the plate 64 and the second flank 70.2, 72.2 of the right or left bracket 70, 72 are positioned between the first and second branches 96.1, 96.2 of the clevis 96 of the first or second link 74, 80. Each of the first and second reinforcement connection pins 78, 84 comprises a hollow tube 100 configured to be housed in the reinforcement and link bores 94, 98, approximately parallel to the longitudinal direction. Each hollow tube 100 can be associated with a translation-blocking system in order to keep it in the reinforcement and link bores 94, 98.

Each of the first and second links 74, 80 has a Y shape and comprises a single branch at a first end cooperating with the engine 54 and two branches which are parallel to one another at a second end cooperating with the front transverse reinforcement 62.

Figure 12:
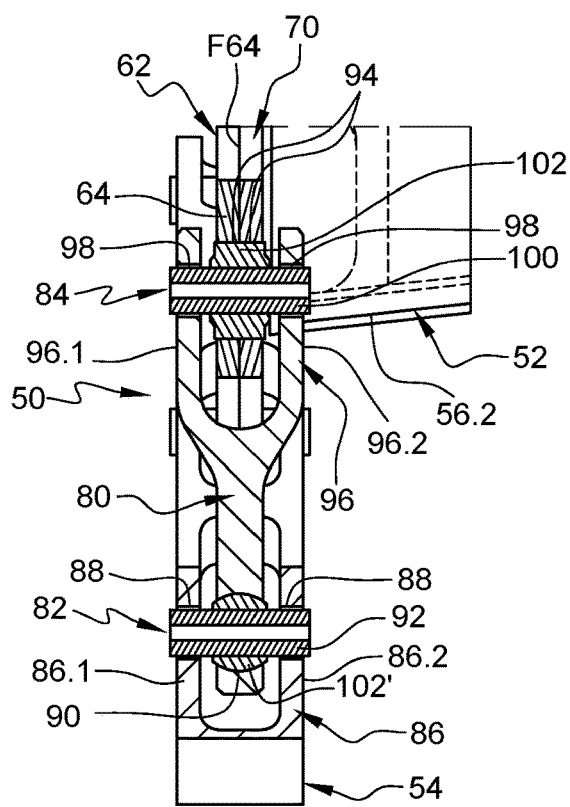
FIG. 12 is a section taken along the line XII-XII of FIG. 9.
Figure 13:
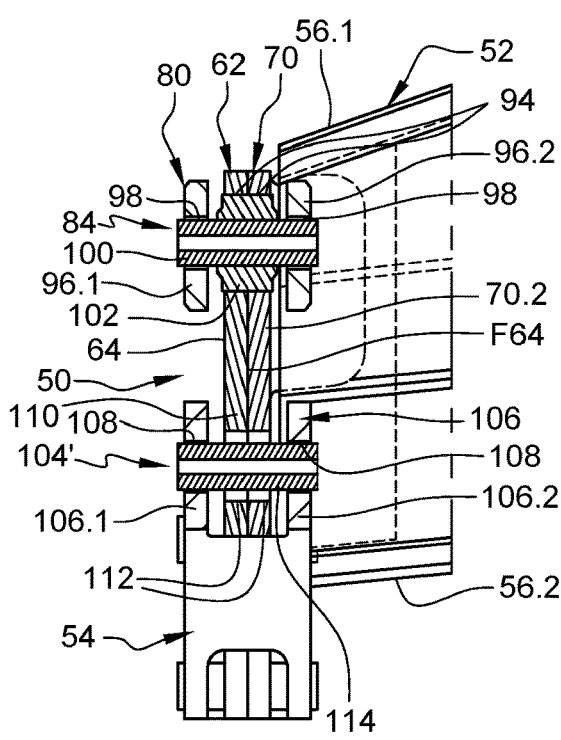
FIG. 13 is a section taken along the line XIII-XIII of FIG. 9.

According to one configuration which can be seen in FIG. 12, each of the first and second reinforcement connection pins 78, 84 comprises a ball joint 102 interposed between the hollow tube 100 and the reinforcement bores 94 of the right or left extension 68*d*, 68*g* of the plate 64 and the second flank 70.2, 72.2 of the right or left bracket 70, 72. Each of the first and second engine connection pins 76, 82 comprises a ball joint 102' interposed between the hollow tube 92 and the link bore 90 of the first or second link 74, 80.

According to one embodiment, the front engine mount 50 comprises at least one safety connection pin 104 connecting the front transverse reinforcement 62 and the engine 54.

For each safety connection pin 104, the engine 54 comprises a clevis 106 having first and second flanges 106.1, 106.2 parallel to one another, spaced between them and positioned in substantially transverse planes, the first and second flanges 106.1, 106.2 having coaxial engine bores 108. For each safety connection pin 104, the plate 64 comprises a lower extension 110 projecting with respect to the lower spar 56.2, positioned between the first and second flanges 106.1, 106.2 of the engine 54 in operation, comprising a reinforcement bore 112 having a diameter greater than that of the engine bores 108, approximately coaxial to the engine bores 108 when the safety connection pin 104 is mounted.

Each safety connection pin 104 comprises a hollow tube 114 configured to be housed in the engine and reinforcement bores 108, 112, approximately parallel to the longitudinal direction, the hollow tube 114 having a diameter substantially identical to that of the engine bores 108. In operation, a clearance is present between the hollow tube 114 and the plate 64 of the front transverse reinforcement 62. Each hollow tube 114 can be associated with a translation-blocking system in order to keep it in the engine and reinforcement bores 108, 112.

According to one embodiment, the front engine mount 50 is symmetrical with respect to a vertical mid-plane PVM and comprises two safety connection pins 104, 104' positioned in a symmetrical manner with respect to the vertical mid-plane PVM.

According to one configuration, each of the right and left extensions 68*d*, 68*g* of the plate 64 comprises a region projecting with respect to the lower spar 56.2 in order to form the lower extension 110. In addition, the second flanks 70.2, 72.2 of the right and left brackets 70, 72 have the same geometry as the right and left extensions 68*d*, 68*g* of the plate 64. Thus, the second flank 70.2 of the right bracket 70 completely covers the right extension 68*d* of the plate 64, the second flank 70.2 of the right bracket 70 and the right extension 68*d* of the plate 64 comprising two reinforcement bores 94, 112, a first reinforcement bore 94 intended for the first reinforcement connection pin 78 of the first link 74 and a second reinforcement bore 112 intended for a first safety connection pin 104. In parallel, the second flank 72.2 of the left bracket 72 completely covers the left extension 68*g* of the plate 64, the second flank 72.2 of the left bracket 72 and the left extension 68*g* of the plate 64 comprising two reinforcement bores 94, 112, a first reinforcement bore 94 intended for the second reinforcement connection pin 84 of the second link 80 and a second reinforcement bore 112 intended for a second safety connection pin 104'.

According to the invention, the links 74, 80 of the front engine mount 50 are directly connected to the front transverse reinforcement 62 of the primary structure 52 of the pylon, with the result that the transverse beam is dispensed with, the front transverse reinforcement 62 of the primary structure 52 of the pylon incorporating its functions. In the absence of a transverse beam, the connection elements connecting the front transverse reinforcement and the transverse beam are also dispensed with. Finally, dispensing with the transverse beam and its connection elements makes it possible to reduce the on-board mass and the production costs.

According to another particular feature, each right or left bracket 70, 72 provides a "fail-safe"-type function and makes it possible to obtain a force path between the engine 54 and the primary structure 52 in the event of damage to the plate 64 or to the first or second link 74, 80.

According to a first operating mode, in order to connect the engine 54 to the primary structure 52, the first and second links 74, 80 are connected to the front transverse reinforcement 62. The engine 54 is then raised or hoisted in such a way that the bores of the front transverse reinforcement 62 and also first and second links 74, 80 coincide with those of the engine 54. Finally, the engine and safety connection pins 76, 82, 104, 104' are put in place.

According to a second operating mode, the first and second links 74, 80 are connected to the engine 54. Next, the engine 54 is raised or hoisted in such a way that the bores of the front transverse reinforcement 62 coincide with those of the first and second links 74, 80 and also of the engine 54. Finally, the reinforcement and safety connection pins 78, 84, 104, 104' are put in place.

Whatever the operating mode, the mounting operation requires only a simple vertical translation movement of the engine 54 in order to fix it and no longer requires an operation of clamping fixing elements of the transverse beam with a high clamping torque that requires the use of bulky tools.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly comprising:
a primary structure of a pylon,
an engine, and
a front engine mount connecting the primary structure and the engine,
the primary structure having upper and lower spars, right and left lateral panels and also a front transverse reinforcement,
the front engine mount having a first link connected to the engine by a first engine connection pin and also a second link connected to the engine by a second engine connection pin,
the front transverse reinforcement comprising right and left extensions projecting with respect to the right and left lateral panels, a right bracket having a first flank connected to the right lateral panel of the primary structure and a second flank pressed against the right extension and also a left bracket having a first flank connected to the left lateral panel of the primary structure and a second flank pressed against the left extension, and
the front engine mount comprising a first reinforcement connection pin connecting the first link and the front transverse reinforcement and passing through the right extension and the second flank of the right bracket and also a second reinforcement connection pin connecting the second link and the front transverse reinforcement and passing through the left extension and the second flank of the right bracket.

2. The propulsion assembly as claimed in claim 1, wherein the front engine mount comprises at least one safety connection pin connecting the front transverse reinforcement and the engine, and the front transverse reinforcement comprises a lower extension projecting with respect to the lower spar of the primary structure and having the at least one safety connection pin passing through the lower extension.

3. The propulsion assembly as claimed in claim 1, wherein the front engine mount comprises two safety connection pins and each of the right and left extensions comprises a region projecting with respect to the lower spar to form a lower extension.

4. The propulsion assembly as claimed in claim 3, wherein the second flank of the right bracket and the right extension comprise a first reinforcement bore configured to receive the first reinforcement connection pin of the first link and also a second reinforcement bore configured to receive a first safety connection pin, and the second flank of the left bracket and the left extension comprise a first reinforcement bore configured to receive the second reinforcement connection pin of the second link and also a second reinforcement bore configured to receive a second safety connection pin.

5. The propulsion assembly as claimed in claim 1, wherein the second flanks of the right and left brackets have the same geometry as the right and left extensions.

6. The propulsion assembly as claimed in claim 1, wherein the front engine mount is symmetrical.

7. The propulsion assembly as claimed in claim 1, wherein each of the first and second links has a Y shape and comprises a single branch at a first end cooperating with a clevis of the engine and two branches parallel to one another at a second end between which there are positioned the right or left extension and the second flank of the right or left bracket.

8. The propulsion assembly as claimed in claim 1, wherein the upper and lower spars, and the right and left lateral panels, delimit a front opening, and the front transverse reinforcement comprises a plate having the right and left extensions and also a projecting shape projecting with respect to the plate and configured to fit into the front opening, the first flank of the right bracket being interposed between the projecting shape and the right lateral panel, the first flank of the left bracket being interposed between the projecting shape and the left lateral panel.

9. The propulsion assembly as claimed in claim 8, wherein the first flank of the right bracket is connected to an inner face of the right lateral panel of the primary structure, and the first flank of the left bracket is connected to an inner face of the left lateral panel of the primary structure.

10. The propulsion assembly as claimed in claim 9, wherein the right bracket is made in one piece, and the left bracket is made in one piece.

11. An aircraft having at least one propulsion assembly comprising:
   a primary structure of a pylon,
   an engine, and
   a front engine mount connecting the primary structure and the engine,
      the primary structure having upper and lower spars, right and left lateral panels and also a front transverse reinforcement,
      the front engine mount having a first link connected to the engine by a first engine connection pin and also a second link connected to the engine by a second engine connection pin,
      the front transverse reinforcement comprising right and left extensions projecting with respect to the right and left lateral panels, a right bracket having a first flank connected to the right lateral panel of the primary structure and a second flank pressed against the right extension and also a left bracket having a first flank connected to the left lateral panel of the primary structure and a second flank pressed against the left extension, and
   the front engine mount comprising a first reinforcement connection pin connecting the first link and the front transverse reinforcement and passing through the right extension and the second flank of the right bracket and also a second reinforcement connection pin connecting the second link and the front transverse reinforcement and passing through the left extension and the second flank of the left bracket.

* * * * *